United States Patent
Illand

(10) Patent No.: US 9,555,592 B2
(45) Date of Patent: Jan. 31, 2017

(54) METHOD FOR MANUFACTURING A TURBINE ENGINE BLADE ROOT OF A COMPOSITE MATERIAL AND BLADE ROOT OBTAINED BY SUCH A METHOD

(71) Applicant: SNECMA, Paris (FR)

(72) Inventor: Hubert Illand, Bonchamp les Laval (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/648,762

(22) PCT Filed: Dec. 3, 2013

(86) PCT No.: PCT/FR2013/052925
§ 371 (c)(1),
(2) Date: Jun. 1, 2015

(87) PCT Pub. No.: WO2014/087093
PCT Pub. Date: Jun. 12, 2014

(65) Prior Publication Data
US 2015/0315920 A1 Nov. 5, 2015

(30) Foreign Application Priority Data
Dec. 5, 2012 (FR) .................................... 12 61640

(51) Int. Cl.
*B29D 99/00* (2010.01)
*F01D 5/14* (2006.01)
(Continued)

(52) U.S. Cl.
CPC ........... *B29D 99/0025* (2013.01); *B29C 70/24* (2013.01); *B29C 70/42* (2013.01); *D03D 25/005* (2013.01);
(Continued)

(58) Field of Classification Search
CPC ..... B29D 99/0025; B29C 70/42; B29C 70/24; B29L 2031/082; F01D 5/147; F01D 5/30; F01D 5/3007; F01D 5/3084; F01D 5/284; F01D 5/282; F05D 2240/30; F05D 2220/30; F05D 2230/31; F05D 2300/603; F05D 2300/6033; D03D 25/005
(Continued)

(56) References Cited

U.S. PATENT DOCUMENTS 2,868,441 A * 1/1959 Reutt ...................... F01D 5/282
156/293
3,752,600 A * 8/1973 Walsh ..................... F01D 5/282
415/217.1
(Continued)

FOREIGN PATENT DOCUMENTS

FR 2 939 129 A1 6/2010
FR 2 941 487 A1 7/2010
(Continued)

OTHER PUBLICATIONS

International Preliminary Report on Patentability and the Written Opinion of the International Searching Authority as issued in International Patent Application No. PCT/FR2013/052925, dated Jun. 9, 2015.
(Continued)

*Primary Examiner* — Dwayne J White
*Assistant Examiner* — Adam W Brown
(74) *Attorney, Agent, or Firm* — Pillsbury Winthrop Shaw Pittman LLP

(57) ABSTRACT

A method of fabricating a turbine engine blade root out of composite material including fiber reinforcement densified by a matrix, the method including making a central fiber strip and two outer fiber strips from three sets of yarn layers interlinked by three-dimensional weaving, passing the two
(Continued)

outer strips through the central strip with the two outer strips crossing each other inside the central strip, eliminating the portions of the two outer strips lying outside the central strip by cutting them off, shaping the fiber blank in order to obtain a preform having a main portion forming a blade-root preform integral with two secondary portions forming bearing-plate preforms, and densifying the preform densified by the matrix.

13 Claims, 1 Drawing Sheet

(51) Int. Cl.
| | | |
|---|---|---|
| *F01D 5/30* | (2006.01) | |
| *B29C 70/42* | (2006.01) | |
| *B29C 70/24* | (2006.01) | |
| *D03D 25/00* | (2006.01) | |
| *F01D 5/28* | (2006.01) | |
| *B29L 31/08* | (2006.01) | |

(52) U.S. Cl.
CPC ............... *F01D 5/147* (2013.01); *F01D 5/282* (2013.01); *F01D 5/284* (2013.01); *F01D 5/30* (2013.01); *F01D 5/3007* (2013.01); *F01D 5/3084* (2013.01); *B29L 2031/082* (2013.01); *F05D 2220/30* (2013.01); *F05D 2230/31* (2013.01); *F05D 2240/30* (2013.01); *F05D 2300/603* (2013.01); *F05D 2300/6033* (2013.01)

(58) Field of Classification Search
USPC .......................................................... 264/258
See application file for complete search history.

(56) References Cited

U.S. PATENT DOCUMENTS

| | | | | |
|---|---|---|---|---|
| 4,363,602 A | * | 12/1982 | Martin | .................... F01D 5/282 |
| | | | | 416/230 |
| 5,375,978 A | * | 12/1994 | Evans | ..................... B64C 11/26 |
| | | | | 416/224 |
| 5,573,377 A | * | 11/1996 | Bond | ...................... F01D 5/147 |
| | | | | 416/219 R |
| 7,329,101 B2 | * | 2/2008 | Carper | .................. C04B 35/565 |
| | | | | 416/219 R |
| 2005/0084377 A1 | | 4/2005 | Dambrine et al. | |

FOREIGN PATENT DOCUMENTS

| | | |
|---|---|---|
| WO | WO 2006/136755 A2 | 12/2006 |
| WO | WO 2010/061140 A1 | 6/2010 |

OTHER PUBLICATIONS

International Search Report as issued in International Patent Application No. PCT/FR2013/052925, dated May 28, 2014.

\* cited by examiner

METHOD FOR MANUFACTURING A TURBINE ENGINE BLADE ROOT OF A COMPOSITE MATERIAL AND BLADE ROOT OBTAINED BY SUCH A METHOD

CROSS REFERENCE TO RELATED APPLICATIONS

This application is the U.S. National Stage of PCT/FR2013/052925 filed Dec. 3, 2013, which in turn claims priority to French Application No. 1261640, filed Dec. 5, 2012. The contents of both applications are incorporated herein by reference in their entirety.

BACKGROUND OF THE INVENTION

The present invention relates to the general field of making a blade out of composite material for a rotor wheel of a turbine engine. The invention relates more particularly to fabricating the root of such a blade.

The intended field is that of gas turbine rotor blades for aeroengines or for industrial turbines.

Proposals have already been made to make blades for turbine engines out of composite material, and in particular out of ceramic matrix composite (CMC) material. Reference may be made in particular to Document FR 2 939 129, which describes fabricating a turbine engine blade out of composite material comprising fiber reinforcement that is densified by a matrix. With such a method, the resulting blade presents in particular a root that is formed from a fiber strip extending in a direction that corresponds to the longitudinal direction of the blade.

Furthermore, in order to mount such a blade on a rotor disk, it is known to give the blade root the shape of a bulb. The blade root with its bulb shape co-operates with a slot of complementary shape formed in the periphery of the rotor disk in order to retain the blade radially on the disk by means of a dovetail-type connection.

When a blade is made out of composite material, the bulb shape of the blade root is generally obtained during the weaving of the fiber blank that is to constitute the blade by forming extra thickness in the blade root, this extra thickness subsequently being machined to the final shapes of the bulb. In practice, the extra thickness is usually obtained by adding an insert while weaving the fiber blank.

Nevertheless, such a method of fabricating a blade out of composite material with a bulb-shaped root presents numerous drawbacks. Making the insert and putting it into position during weaving of the fiber blank of the blade are operations that are very difficult. In addition, the attachment of the blade presents mechanical strength difficulties and it becomes degraded in fatigue by oxidation.

Also known, from Document FR 2 941 487, is a solution for mounting a composite material blade on a rotor disk in which the blade root is clamped between metal plates that are fastened together by means of a welded peg. With that solution, the main force retaining the blade on the rotor disk is taken up by shear in the peg and by compression against the hole in the composite material. Nevertheless, expansion differences between the metal of the plate and the composite material of the root give rise either to thermal shear stresses if the fastening is rigid, or to uncertainty about the positioning of the bearing plates if the fastening is provided with slack.

OBJECT AND SUMMARY OF THE INVENTION

A main object of the present invention is thus to mitigate such drawbacks by proposing a blade root made of composite material in which the attachment with a rotor disk by a dovetail-type connection does not present the above-mentioned drawbacks.

This object is achieved by a method of fabricating a turbine engine blade root out of composite material comprising fiber reinforcement densified by a matrix, the method comprising making a central fiber strip and two outer fiber strips from three sets of yarn layers interlinked by three-dimensional weaving, the fiber strips extending in a common direction corresponding to the longitudinal direction of the blade root to be fabricated and the yarns of the yarn layer sets not being interlinked between the various fiber strips, passing the two outer strips through the central strip with the two outer strips crossing each other inside the central strip, eliminating the portions of the two outer strips lying outside the central strip by cutting them off in order to form a blade-root fiber blank, shaping the fiber blank in order to obtain a fiber preform having a main portion forming a blade-root preform integral with two secondary portions forming bearing-plate preforms, and densifying the fiber preform with a matrix in order to obtain a blade root made of composite material having fiber reinforcement constituted by the preform and densified by the matrix.

Such a fabrication method enables a blade root to be obtained having bearing plates that can withstand heavy loads with less deformation. The forces of the rotor disk on these bearing plates act in the direction of the yarns of the fiber strip portions constituting the bearing plate. In particular, these forces do not lead to yarn layers being flattened. The lifetime of the blade root is increased for a given size.

Furthermore, this fabrication method avoids having recourse to using an insert while weaving the fiber blank for the purpose of giving the root its bulb shape. That simplifies the method, achieves greater robustness, makes it possible to densify the preform without significantly exceeding the thickness of the central strip, and achieves savings in terms of fabrication cycles and costs.

Advantageously, the two outer strips pass through the central strip in directions forming an angle lying in the range 15° to 75°, and preferably equal to 45°, relative to the direction of the central strip.

The central strip may also be used for making a fiber preform for a blade airfoil. Likewise, at least one of the outer strips may also be used for making a fiber preform for an inner and/or outer blade platform.

The fiber strips may be woven with their longitudinal directions that correspond to the direction of the blade root that is to be fabricated extending in the warp direction. Alternatively, the fiber strips may be woven with their longitudinal directions that correspond to the direction of the blade root that is to be fabricated extending in the weft direction.

Correspondingly, the invention provides a turbine engine blade root made of composite material comprising fiber reinforcement densified by a matrix, the blade root being characterized in that it includes a blade-root constituting portion integrally formed with two bearing-plate constituting portions, the two bearing-plate constituting portions passing through the blade-root constituting portion with the bearing-plate constituting portions crossing within the blade-root constituting portion.

The blade root may be made of ceramic matrix composite material.

The invention also provides a turbine engine blade having a blade root as defined above or fabricated using the method as defined above. The invention also provides a turbine engine fitted with at least one such blade.

BRIEF DESCRIPTION OF THE DRAWING

Other characteristics and advantages of the present invention appear from the following description made with reference to the accompanying drawing, which show an implementation having no limiting character. In the figures.

DETAILED DESCRIPTION OF THE INVENTION

Figure 1:
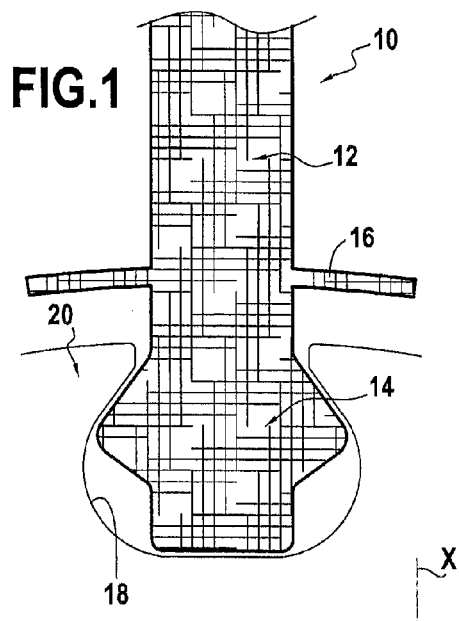
FIG. 1 is a view of a blade root of the invention mounted on a rotor disk.

The invention is applicable to various blades made of composite material for a turbine engine, and in particular to the compressor and turbine blades of various spools of a gas turbine engine, for example to the blades of a low pressure turbine, such as the blades shown in part in FIG. 1.

In known manner, the blade 10 shown in this figure comprises an airfoil 12, a root 14, and a platform 16 situated between the root 14 and the airfoil 12. The blade could also have an outer platform (not shown) in the vicinity of its free end (or tip).

The airfoil 12 of the blade has a curved aerodynamic profile that extends (in the longitudinal direction) from the platform 16 to its tip. This profile is of varying thickness and is formed with a pressure side surface and a suction side surface that join together transversely via a leading edge and via a trailing edge (not shown).

In this example, the root 14 of the blade is in the shape of a bulb and it is for mounting in a slot 18 formed in the periphery of a rotor disk 20 via a connection of the dovetail type.

The blade 10 and its root 14 are made of composite material, and preferably of ceramic matrix composite (CMC) material. By way of example, reference may be made to international patent application WO 2010/061140, which describes an example of fabricating a turbine engine blade by making a airfoil preform by three-dimensional weaving and by densifying the preform with a matrix.

More particularly, that method provides for using three-dimensional weaving to make a single-piece fiber blank, shaping the fiber blank in order to obtain a single-piece fiber preform having a first portion forming a blade airfoil and root preform, and at least one second portion forming a preform for an inner or outer platform of the blade, and then densifying the preform with a matrix. That method thus enables a blade to be obtained that is made out of composite material having fiber reinforcement constituted by the preform and densified by the matrix, and forming a single piece with at least one platform incorporated therein.

Figure 3:
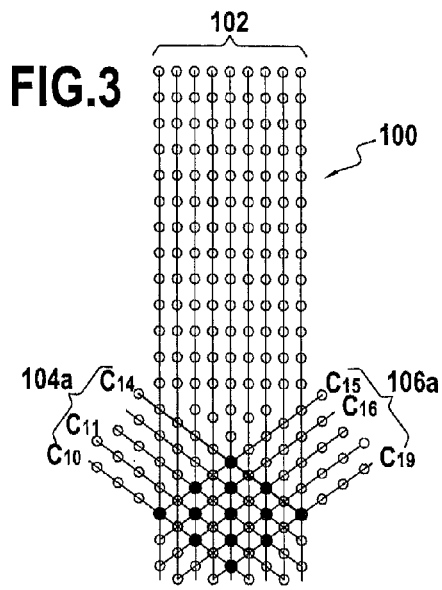
FIG. 3 is a diagrammatic view of the fiber blank obtained by the arrangement of FIG. 2.
Figure 2:
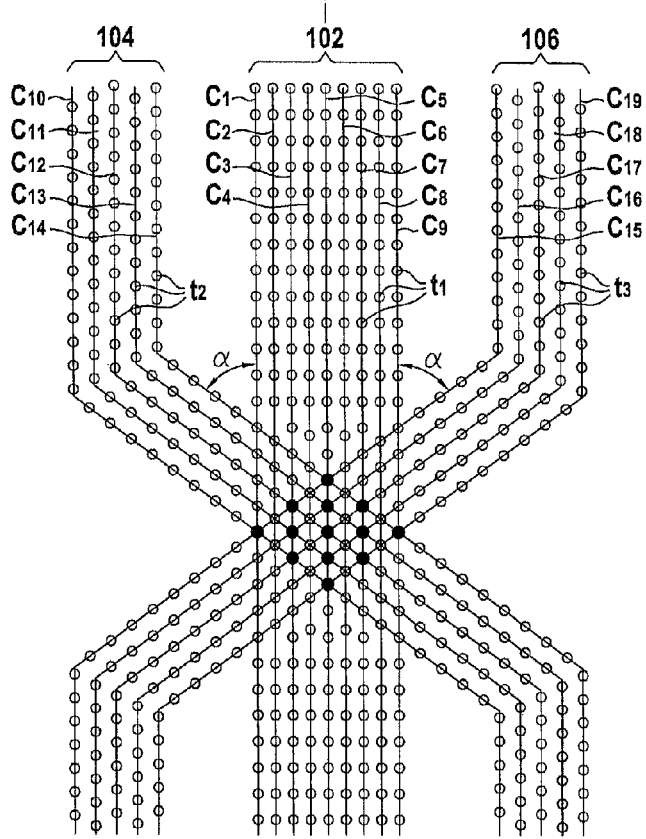
FIG. 2 is a highly diagrammatic view showing the arrangement of three fiber strips for making a fiber blank in order to fabricate the FIG. 1 blade root.

FIGS. 2 and 3 are highly diagrammatic and show how to make a fiber blank from which a fiber preform 100 for a blade root can be shaped so that, after being densified and possibly also machined, a root is obtained for a blade of the kind shown in FIG. 1.

The blank is made from three fiber strips, each obtained by three-dimensional weaving or multilayer weaving, namely a central strip 102 surrounded by two outer strips 104 and 106. These three fiber strips extend generally in a direction X corresponding to the longitudinal direction of the root to be fabricated.

In this example, it is assumed that the weaving of the fiber strips 102, 104, and 106 is performed with warp yarns extending in the longitudinal direction X of the root to be fabricated, it being observed that weaving with weft yarns extending in this direction is also possible.

Furthermore, in the example of FIG. 2, the central strip 102 comprises a set of warp yarn layers, with the number of these layers in this example being equal to nine (layers $c_1$ to $c_9$). As for the outer strips 104 and 106, each of them comprises a set of warp yarn layers equal to five (layers $c_{10}$ to $c_{14}$ for the outer strip 104 and layers $c_{15}$ to $c_{19}$ for the outer layer 106).

The warp yarns of the sets of yarn layers forming the central strip 102 and the two outer strips 104 and 106 are interlinked by three-dimensional weaving using respective weft yarns given respective references $t_1$, $t_2$, and $t_3$. It is possible to use various types of three-dimensional weaving. In particular, reference may be made to Document WO 2006/136755, which gives various examples.

When fabricating a blade using the method described in Document WO 2010/061140, the central strip 102 is advantageously used for making the portion that, after shaping, is to constitute a blade preform portion corresponding to the airfoil preform. Likewise, one of the two outer strips may advantageously be used for making the portion that, after shaping, is to constitute a blade preform portion corresponding to the platform preform.

Beyond the portion of the central strip 102 that, after shaping, is to constitute the blade preform portion corresponding to the airfoil preform, each of the outer strips 104 and 106 passes through the central strip 102 so as to emerge from the side of the central strip opposite from the side of their insertion. In addition, in this movement of passing through the central strip, these outer strips cross each other inside the central strip.

This produces an X-shaped cross of the two outer strips 104 and 106 within the central strip 102, with the outer strip being interchanged beyond the zone of the fiber blank that corresponds to them passing through the central strip.

It should be observed that the yarns of the various sets of yarn layers making up the central strip 102 and the two outer strips 104 and 106 are not interlinked ahead of or beyond the zone of the fiber blank corresponding to the two outer strips passing through the central strip.

The two outer strips 104 and 106 pass through the central strip 102 in directions forming an angle α lying in the range 15° to 75° relative to the direction X of the central strip. Preferably, this angle α is equal to 45°.

The fiber strips are then cut as follows. The central strip 102 is cut a little beyond the zone corresponding to the two outer strips crossing each other therein. The outer strips 104 and 106 are cut firstly level with the respective faces of the central strip through which they emerge after crossing (the outer portions of the central strip are cut), and secondly ahead of the zone corresponding to passing through the central strip in order to leave strip segments 104a and 106a remaining on either side of the central strip (FIG. 3).

A fiber preform 100 for the blade root that is to be fabricated is then obtained by molding so as to form a preform with a main portion forming a root preform integrally with two secondary portions corresponding to the strip segments 104a and 106a and forming bearing-plate preforms. After molding, the strip segments 104a and 106a form an angle lying in the range 15° to 75° relative to the longitudinal direction of the blade.

After machining, where necessary, the preform of the blade root is densified with a matrix in order to obtain a blade root made of composite material having fiber reinforcement constituted by the preform and densified by the matrix.

In the context of fabricating a blade using the method described in Document WO 2010/061140, it should be observed that the preform of the blade root 100 is advantageously formed as a single piece with the portion of the preform that corresponds to the airfoil preform.

The invention claimed is:

1. A method of fabricating a turbine engine blade root out of composite material comprising fiber reinforcement densified by a matrix, the method comprising:
    making a central fiber strip and two outer fiber strips from three sets of yarn layers, the yarn layers in each individual set of yarn layers being interlinked by three-dimensional weaving, the fiber strips extending in a common direction corresponding to a longitudinal direction of the blade root to be fabricated and the yarns of the three yarn layer sets not being interlinked between the central and two outer fiber strips;
    passing the two outer fiber strips through the central fiber strip with the two outer fiber strips crossing each other inside the central fiber strip;
    eliminating portions of the two outer fiber strips lying outside the central fiber strip by cutting them off in order to form a blade root fiber blank;
    shaping the blade root fiber blank in order to obtain a fiber preform having a main portion forming a blade-root preform integral with two secondary portions forming bearing-plate preforms; and
    densifying the fiber preform with a matrix in order to obtain a blade-root made of composite material having fiber reinforcement constituted by the preform and densified by the matrix.

2. A method according to claim 1, wherein the two outer fiber strips pass through the central fiber strip in directions forming an angle (α) lying in the range 15° to 75° relative to a direction of the central fiber strip.

3. A method according to claim 2, wherein the two outer fiber strips pass through the central fiber strip in directions forming an angle (α) of 45° relative to the direction of the central fiber strip.

4. A method according to claim 1, wherein the central fiber strip is also used for making a fiber preform for a blade airfoil.

5. A method according to claim 1, wherein at least one of the outer fiber strips is also used for making a fiber preform for a blade platform.

6. A method according to claim 1, wherein the central and two outer fiber strips are woven with their longitudinal directions that correspond to the longitudinal direction of the blade root that is to be fabricated extending in a warp direction.

7. A method according to claim 1, wherein the central and two outer fiber strips are woven with their longitudinal directions that correspond to the longitudinal direction of the blade root that is to be fabricated extending in a weft direction.

8. A turbine engine blade root made of composite material comprising fiber reinforcement densified by a matrix, the turbine engine blade root comprising a blade-root constituting portion integrally formed with two bearing-plate constituting portions, the blade-root constituting portion including a central fiber strip constituted by a first set of yarn layers interlinked by three dimensional weaving, the bearing-plate constituting portions including respectively a first and a second outer fiber strip constituted respectively by a second set of yarn layers interlinked by three-dimensional weaving and a third set of yarn layers interlinked by three-dimensional weaving, the yarn of the first, second and third sets of yarn layers not being interlinked between the central fiber strip and the first and second outer fiber strips, the first set of yarn layers of the central fiber strip having the yarns of the second set of yarn layers and of the third set of yarn layers crossing therethrough with the two outer fiber strips crossing each other inside the central fiber strip.

9. A blade root according to claim 8, wherein the two bearing-plate constituting portions form an angle lying in the range 15° to 75° with the blade-root constituting portion.

10. A blade root according to claim 9, wherein the two bearing-plate constituting portions form an angle of 45° with the blade-root constituting portion.

11. A blade root according to claim 8, wherein the blade root is made of ceramic matrix composite material.

12. A turbine engine blade comprising a blade root according to claim 8.

13. A turbine engine comprising at least one blade according to claim 12.

* * * * *